United States Patent
Nag et al.

(10) Patent No.: US 11,669,271 B2
(45) Date of Patent: Jun. 6, 2023

(54) MEMORY OPERATIONS USING COMPOUND MEMORY COMMANDS

(71) Applicant: ADVANCED MICRO DEVICES, INC., Santa Clara, CA (US)

(72) Inventors: Anirban Nag, Milpitas, CA (US); Nuwan Jayasena, Santa Clara, CA (US); Shaizeen Aga, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/848,920

(22) Filed: Apr. 15, 2020

(65) Prior Publication Data
US 2021/0326063 A1 Oct. 21, 2021

(51) Int. Cl.
G06F 3/06 (2006.01)
G06F 9/448 (2018.01)
G06F 9/48 (2006.01)

(52) U.S. Cl.
CPC ...... *G06F 3/0659* (2013.01); *G06F 3/0611* (2013.01); *G06F 3/0614* (2013.01); *G06F 3/0673* (2013.01); *G06F 9/4498* (2018.02); *G06F 9/4881* (2013.01)

(58) Field of Classification Search
CPC .... G06F 3/0659; G06F 3/0614; G06F 3/0611; G06F 3/0673; G06F 9/4881; G06F 9/4498; G06F 13/1668
See application file for complete search history.

(56) References Cited

U.S. PATENT DOCUMENTS

| 6,681,319 | B1 | 1/2004 | Djafarian et al. | |
|---|---|---|---|---|
| 2006/0262608 | A1* | 11/2006 | Babb | G11C 16/32 365/230.03 |
| 2007/0121399 | A1 | 5/2007 | Bains | |
| 2010/0275074 | A1* | 10/2010 | Nicolaidis | G11C 29/56 714/718 |
| 2014/0181427 | A1 | 6/2014 | Jayasena et al. | |
| 2016/0232111 | A1 | 8/2016 | Chang et al. | |
| 2019/0018597 | A1* | 1/2019 | Zhang | G06F 3/0611 |
| 2020/0176047 | A1* | 6/2020 | Meier | G11C 11/221 |

OTHER PUBLICATIONS

Seshadri et al., "RowClone: Fast and Energy-Efficient In-DRAM Bulk Data Copy and Initialization", MICRO-46: Proceedings of the 46th Annual IEEE/ACM International Symposium on Microarchitecture, dated Dec. 2013, 13 pages.
Shin et al., "McDRAM: Low Latency and Energy-Efficient Matrix Computations in DRAM", IEEE Transaction on Computer-Aided Design of Integrated Circuits and Systems, vol. 37, Issue 11, Nov. 2018, 10 pages.
International Search Report and Written Opinion, PCT/US2021/027288, dated Aug. 5, 2021, 11 pages.

\* cited by examiner

*Primary Examiner* — Ernest Unelus

(57) ABSTRACT

Memory operations using compound memory commands, including: receiving, by a memory module, a compound memory command indicating one or more operations to be applied to each portion of a plurality of portions of contiguous memory in the memory module; generating, based on the compound memory command, a plurality of memory commands to apply the one or more operations to each portion of the plurality of portions of contiguous memory; and executing the plurality of memory commands.

18 Claims, 7 Drawing Sheets

MEMORY OPERATIONS USING COMPOUND MEMORY COMMANDS

BACKGROUND

To perform in-memory operations, processors would need to send large number of fine-grained memory commands. The throughput of the in-memory operations would depend on the bandwidth at which such fine-grained commands can be sent to the memory. In addition to any in-core bottlenecks which limit this command bandwidth, this bandwidth would also be affected by the bandwidth utilization of other co-scheduled computations running in parallel on the associated cores.

DETAILED DESCRIPTION

Figure 1:
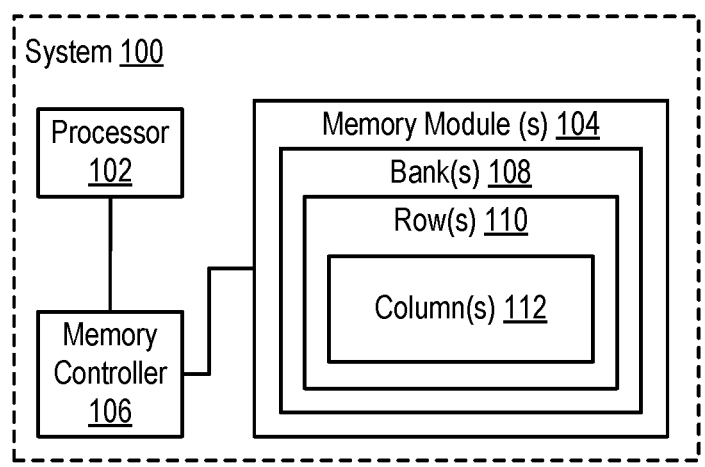
FIG. 1 is a block diagram of an example processor for memory operations using compound memory commands according to some embodiments.

In some embodiments, a method of memory operations using compound memory commands includes receiving, by a memory module, a compound memory command indicating one or more operations to be applied to each portion of a plurality of portions of contiguous memory in the memory module; generating, based on the compound memory command, a plurality of memory commands to apply the one or more operations to each portion of the plurality of portions of contiguous memory; and executing the plurality of memory commands.

In some embodiments the compound memory command indicates, as the plurality of portions of contiguous memory, a starting memory address and a number of columns. In some embodiments, the compound memory command indicates a start address and an end address of the plurality of portions of contiguous memory. In some embodiments, generating the plurality of memory commands includes: determining one or more required row activation commands; and generating the one or more required row activation commands. In some embodiments, determining the one or more required row activation commands includes: maintaining a finite state machine; and determining, based on the finite state machine, the start address, and the end address, the one or more required row activation commands. In some embodiments, the method further includes determining, by a memory controller, a latency associated with the compound memory command. In some embodiments, the method further includes prioritizing, by the memory controller, based on the latency, issuance of one or more other commands. In some embodiments, the method further includes generating, by the memory controller, responsive to the latency exceeding a threshold, a plurality of other compound memory commands based on the compound memory command.

In some embodiments, an apparatus for memory operations using compound memory commands includes: a processor; and a memory controller communicatively coupled to the processor; and a memory module communicatively coupled to the memory controller, the memory module performing steps including: receiving compound memory command indicating one or more operations to be applied to each portion of a plurality of portions of contiguous memory in the memory module; generating, based on the compound memory command, a plurality of memory commands to apply the one or more operations to each portion of the plurality of portions of contiguous memory; and executing the plurality of memory commands.

In some embodiments the compound memory command indicates, as the plurality of portions of contiguous memory, a starting memory address and a number of columns. In some embodiments, the compound memory command indicates a start address and an end address of the plurality of portions of contiguous memory. In some embodiments, generating the plurality of memory commands includes: determining one or more required row activation commands; and generating the one or more required row activation commands. In some embodiments, determining the one or more required row activation commands includes: maintaining a finite state machine; and determining, based on the finite state machine, the start address, and the end address, the one or more required row activation commands. In some embodiments, the memory controller determines a latency associated with the compound memory command. In some embodiments, the memory controller prioritizes, based on the latency, issuance of one or more other commands. In some embodiments, the memory controller generates, responsive to the latency exceeding a threshold, a plurality of other compound memory commands based on the compound memory command.

A memory controller for memory operations using compound memory commands performs steps including: receiving a compound memory command indicating one or more operations to be applied to each portion of a plurality of portions of contiguous memory in the memory module; generating, based on the compound memory command, a plurality of memory commands to apply the one or more operations to each portion of the plurality of portions of contiguous memory; and executing the plurality of memory commands.

In some embodiments the compound memory command indicates, as the plurality of portions of contiguous memory, a starting memory address and a number of columns. In some embodiments, the compound memory command indicates a start address and an end address of the plurality of portions of contiguous memory. In some embodiments, generating the plurality of memory commands includes: determining one or more required row activation commands; and generating the one or more required row activation commands.

FIG. 1 is a block diagram of a non-limiting example system 100. The example system 100 can be implemented in a variety of computing devices, including mobile devices, personal computers, servers, peripheral hardware components, gaming devices, set-top boxes, and the like. The system 100 includes a processor 102. The processor 102 issues instructions or commands to access memory modules 104 by issuing the commands to a memory controller 106. The memory controller 106 is a circuit to manage the flow of data to and from the memory modules 104. For example, the memory controller 106 manages instructions to read from and/or write to the memory modules 104. The memory controller 106 also refreshes the memory modules 104. In some embodiments, the memory controller 106 is an integrated component of the processor 102. In other embodiments, the memory controller 106 is a component separate from the processor 102.

The memory modules 104 are memory used to store data (e.g., volatile or non-volatile). In the exemplary embodiment memory modules 104 are volatile memory modules. The memory modules 104 may comprise, for example, Dynamic Random Access Memory (DRAM). Each memory module 104 includes one or more banks 108. Each bank 108 includes a plurality of rows 110, with each row 110 including a plurality of columns 112. In order to access data from a particular row 110, a row 110 is "activated" and stored in a row buffer of the bank 108. Columns 112 from the row 110 in the row buffer are then able to be read from or written to. Accordingly, accessing data from a particular row 110 requires for an "open" row 110 to be closed assuming the particular row 110 is not the open row 110 in the row buffer, and the particular row 110 opened and stored in the row buffer for access.

Operations such as bulk copying, bulk "zeroing," or processing-in-memory commands conventionally require the processor 102 to issue multiple fine-grained commands to the memory controller 106 for issuance to the memory modules 104. Using this approach, the bandwidth between the processor 102 and memory controller 106 is consumed by these multiple fine-grained commands, and affects the bandwidth available to other computations being run on the processor 102.

Instead, the memory modules 106 is configured to receive compound memory commands from the processor 102 via the memory controller 106. A compound memory command is a single command that causes one or more operations to be applied to an area of contiguous memory (e.g., in a memory module 104). In some embodiments, the operations are operations to be applied to a particular column 112 of a memory module 104. Some examples of the operations caused to be applied by the compound memory command include a column 112 read operation, a column 112 write operation, or a column 112 move to a near-memory register. For example, a compound memory command for bulk zeroing would cause column 112 write operation to be applied to each column 112 in a contiguous area of memory. As another example, a processing-in-memory command for adding two arrays (e.g., two contiguous arrays in memory) is expressed as multiple compound memory commands (e.g., compound memory commands for reading multiple portions of data for each array, compound memory commands for adding multiple portions of the two arrays, and a compound memory command for writing the resulting sum in another contiguous area of memory). In some embodiments, the compound memory command is generated by a compiler in response to a determination that one or more operations are to be applied to a contiguous area of memory. In other embodiments, the compound memory commend is generated by the compiler in response to an explicitly declared compound memory command in the program code.

In response to receiving a compound memory command, the memory module 104 generates a plurality of memory commands to apply the one or more operations to each portion of the plurality of portions of contiguous memory. As an example, in response to receiving a compound memory command for bulk zeroing a contiguous area of memory, the memory module 104 generates a plurality of column 112 write commands that, when executed, cause zero values to be written to each column 112 in the contiguous area of memory. Using this example, the memory module 104 generates the necessary row open commands, if any, and a plurality of write commands to the contiguous area of memory. Thus, a plurality of memory commands (e.g., Dynamic Random Access Memory commands) are generated from a single compound memory command. One skilled in the art will appreciate that, in an alternative embodiment, the plurality of memory commands are generated by the memory controller 106 in response to receiving the compound memory command from a memory client (e.g., processor 102). The memory controller 106 then provides the generated memory commands to the memory module 104 for execution.

In some embodiments, the compound memory command indicates, a start address for the area of contiguous memory and a number of columns to which an operation indicated in the compound memory command will be applied. In other embodiments, the compound memory command indicates a start address and an end address for the area of contiguous memory. In some embodiments, the plurality of portions of contiguous memory are contiguous within a same row 110. In other words, one or more operations are applied to portions of memory located within the same row 110 in a memory module 104. In response to such a compound memory command, the memory module 104 generates, as memory commands, a command to effect the indicated operation for each column in the contiguous area of memory. In some embodiments, the memory module 104 determines whether a row activation command (e.g., to store the row 110 in a row buffer) needs to be generated as one of the plurality of memory commands. Whether a row activation command is required is based on whether the particular row 110 is currently activated, or whether the row 110 will be activated in response to another memory command.

In other embodiments, the plurality of portions of contiguous memory are contiguous across multiple rows 110. As the portions of contiguous memory are contiguous across multiple rows 110, at least one row activation command is required. Accordingly, in some embodiments, the memory module 104 maintains a finite state machine. Based on the one or more memory commands required to effect the compound memory command and the finite state machine, the memory module 104 then determines the required one or more row activation commands.

As a compound memory command results in a plurality of memory commands that occupy a bank 108 for a particular amount of time, in some embodiments, the memory controller 106 implements fairness logic to ensure that the bank 108 is not occupied at the expense of other commands. Accordingly, in some embodiments, the memory controller 106 is configured to calculate a latency associated with a compound memory command. Where the contiguous area of memory of a compound memory command is contiguous across a same row 110, the latency is estimated as, for example, a predefined latency timing for issuing a memory command to a column 112 multiplied by the number of columns 112 associated with the particular compound memory command. In some embodiments, the predefined latency timing is established as a configuration setting for a memory module, a firmware setting, or otherwise defined. In some embodiments, the memory controller 106 also uses latency to deterministically schedule memory commands (e.g., the memory controller 106 knows to wait a number of cycles based on the latency before issuing another command to the same memory region).

Where the contiguous area of memory is contiguous across multiple rows 110, the latency is calculated by determining, based on a start address and end address of the contiguous area of memory (e.g., indicated in the compound memory command or determined based on a start address in the compound memory command and a number of affected columns indicated in the compound memory command), which banks 108 are associated with the contiguous area of memory, the number rows 110 associated with the compound memory command, and whether a first row 110 accessed in each bank 108 is already open, therefore not requiring a row activation command. The latency is then calculated using these values and one or more memory timing values.

In some embodiments, based on the latency, the memory controller 106 prioritizes issuance of other commands (e.g., memory commands) before the compound memory command. For example, in some embodiments, the latency or a weighted latency is used as a threshold. Other commands having latencies falling below the threshold are prioritized and issued to memory modules 104 before issuing the compound memory command to a memory module 104.

In other embodiments, where the latency exceeds the threshold, the memory controller 106 generates a plurality of other compound memory commands based on the compound memory command. In some embodiments, a compound memory command associated with a contiguous area of memory is generated into multiple compound memory commands corresponding to subdivisions of the contiguous area of memory. For example, a compound memory command associated with an area of memory contiguous across multiple rows 110 may be generated into compound memory commands each corresponding to a row 110 in the area of contiguous memory. As another example, a compound memory command associated with an area of memory contiguous across multiple columns 112 in a same row 110 may be generated into multiple compound memory commands each associated with a subdivision of the columns 112. In some embodiments, the latency for the generated compound memory commands are recalculated. Other instructions are prioritized and/or other compound memory commands are generated accordingly, based on the recalculated latencies. In some embodiments the memory controller 106 breaks a compound memory command into multiple compound memory commands based on other rules or criteria. For example, in some embodiments, the memory controller 106 breaks a multi-row compound memory command into multiple single-row compound memory commands independent of latency. As another example, in some embodiments, the memory controller 106 breaks a compound memory command into multiple compound memory commands independent of latency based on a threshold number of operations caused by a single compound memory command.

Figure 2:
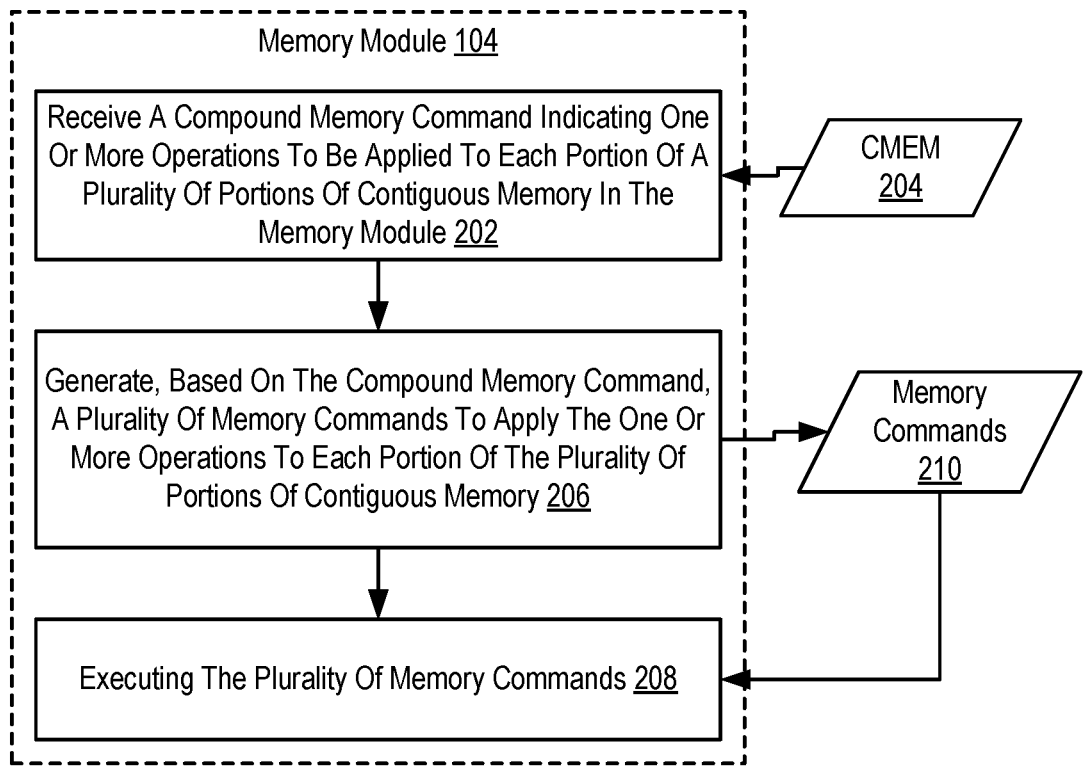
FIG. 2 is a flowchart of an example method for memory operations using compound memory commands according to some embodiments.

For further explanation, FIG. 2 sets forth a flow chart illustrating an exemplary method for memory operations using compound memory commands that includes receiving 202 (e.g., by a memory module 104, from a memory controller 106) a compound memory command (CMEM) 204 indicating one or more operations to be applied to each portion of a plurality of portions of contiguous memory in the memory module 104. In some embodiments, the operations are operations to be applied to a particular column 112 of the memory module 104. Examples of the operations caused to be applied by the compound memory command 204 include a column 112 read operation, a column 112 write operation, or a column 112 move to a near-memory register. For example, a compound memory command 204 for bulk zeroing would cause column 112 write operation to be applied to each column 112 in a contiguous area of memory.

In some embodiments, the compound memory command 204 indicates a start address for the area of contiguous memory and a number of columns to which an operation indicated in the compound memory command will be applied. In other embodiments, the compound memory command 204 indicates a start address and an end address for the plurality of portions of contiguous memory. In some embodiments, the plurality of portions of contiguous memory are contiguous within a same row 110. In other embodiments, the plurality of portions of contiguous memory are contiguous across multiple rows 110.

The method of FIG. 2 also includes generating 206 (e.g., by the memory module 104), based on the compound memory command 204, a plurality of memory commands 210 to apply the one or more operations to each portion of the plurality of portions of contiguous memory. Generating 206 the plurality of memory commands 210 includes generating a memory command 210 for each column 112 in the contiguous memory. The memory commands 210 indicate an operation in the compound memory command 204. In some embodiments, generating 206 the plurality of memory commands 210 also includes generating one or more row activation commands required to activate the rows 110 affected by the memory commands 210.

The method of FIG. 2 also includes executing 208 (e.g., by the memory module 104) the plurality of memory commands 210. Thus, only a single compound memory command 204 need be passed on the bus or connection between the processor 102 and memory controller 106 and the bus or connection between the memory controller 106 and the memory module to cause multiple memory commands 210 to be executed by the memory module 104.

Figure 3:
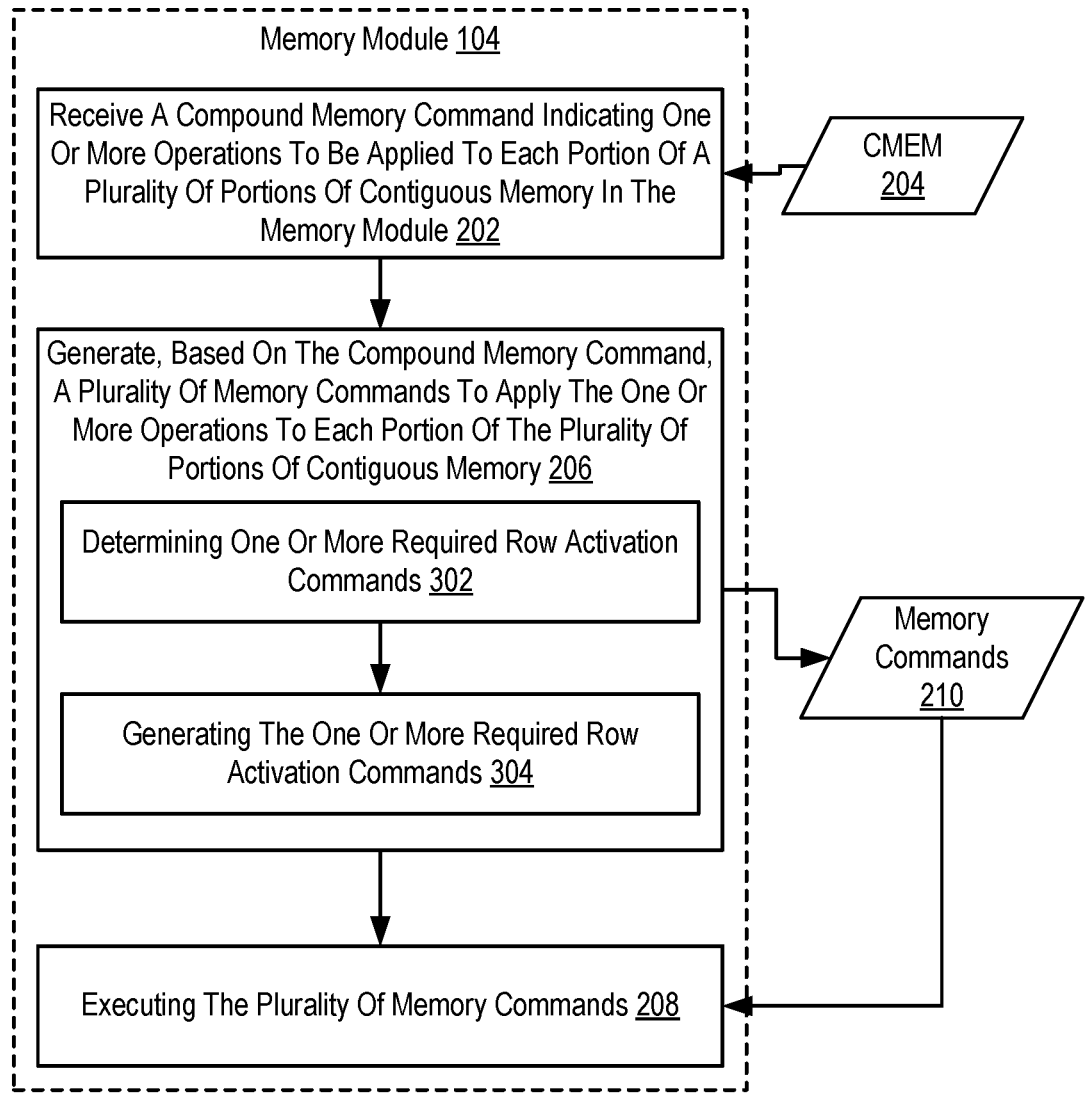
FIG. 3 is a flowchart of an example method for memory operations using compound memory commands according to some embodiments.

For further explanation, FIG. 3 sets forth a flow chart illustrating an exemplary method for memory operations using compound memory commands that includes receiving 202 (e.g., by a memory module 104, from memory controller 106) a compound memory command (CMEM) 204 indicating one or more operations to be applied to each portion of a plurality of portions of contiguous memory in the memory module 104; generating 206 (e.g., by the memory module 104), based on the compound memory command 204, a plurality of memory commands 210 to apply the one or more operations to each portion of the plurality of portions of contiguous memory; and executing 208 (e.g., by the memory module 104) the plurality of memory commands 210.

The method of FIG. 3 differs from FIG. 2 in that generating 206 (e.g., by the memory module 104), based on the compound memory command 204, a plurality of memory commands 210 to apply the one or more operations to each portion of the plurality of portions of contiguous memory includes determining 302 one or more required row activation commands. In some embodiments, where the contiguous memory is contiguous across a same row 110, determining 302 the one or more required row activation commands includes determining whether the row 110 is activated (e.g., opened, stored in a row buffer). In some embodiments, where the contiguous memory is contiguous across multiple rows 110, determining 302 the one or more row activation commands includes determining whether a first accessed row 110 in each bank 108 of the contiguous memory is open. In other embodiments, where the contiguous memory is contiguous across multiple rows 110, determining 302 the one or more row activation commands is based on a finite state machine.

Generating 206 (e.g., by the memory module 104), based on the compound memory command 204, a plurality of memory commands 210 to apply the one or more operations to each portion of the plurality of portions of contiguous memory includes generating 304 the one or more required row activation commands. Thus, the executed 208 memory commands 210 include the one or more required row activation commands.

Figure 4:
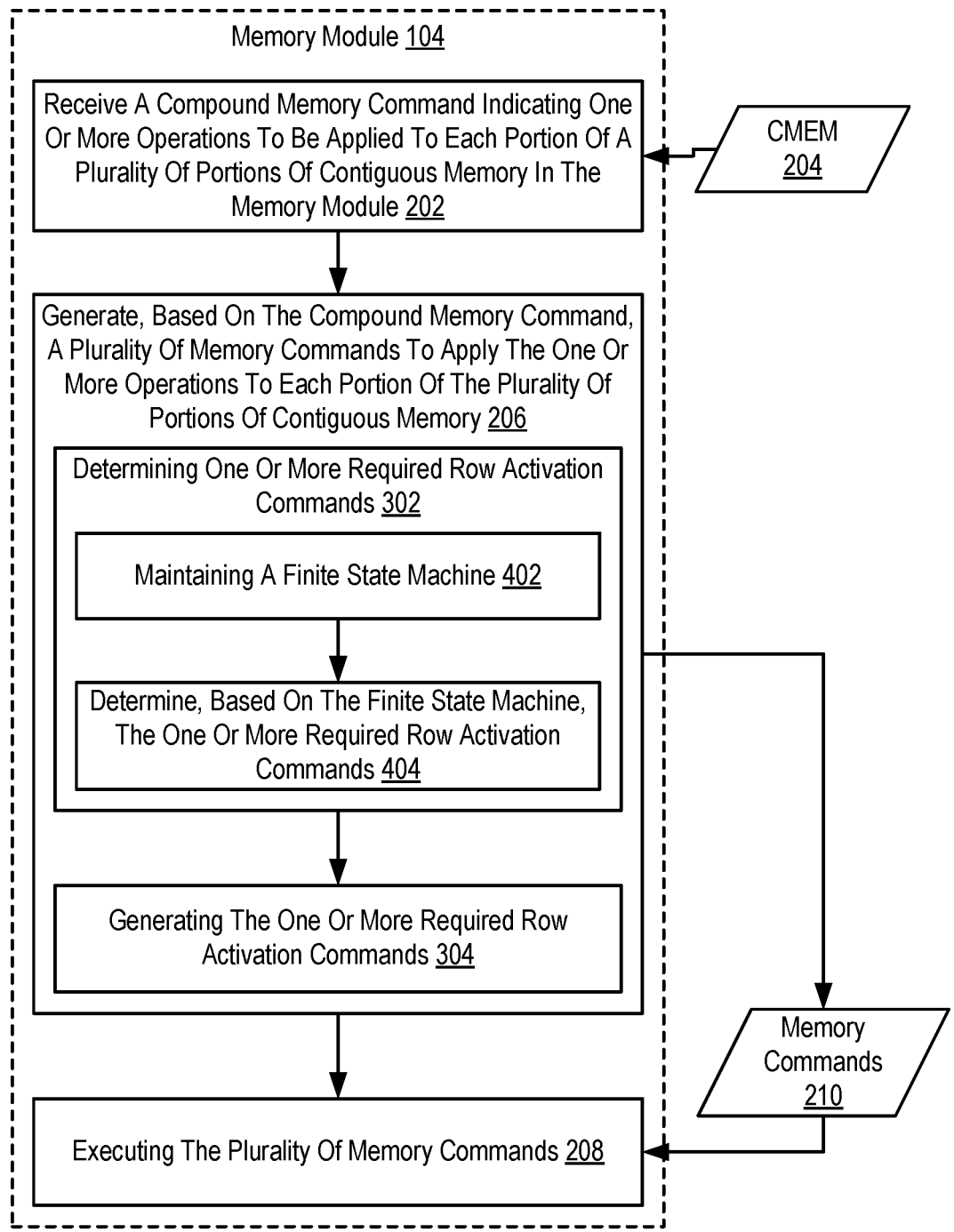
FIG. 4 is a flowchart of an example method for memory operations using compound memory commands according to some embodiments.

For further explanation, FIG. 4 sets forth a flow chart illustrating an exemplary method for memory operations using compound memory commands that includes receiving 202 (e.g., by a memory module 104, from a memory controller 106) a compound memory command (CMEM) 204 indicating one or more operations to be applied to each portion of a plurality of portions of contiguous memory within the memory module 104; generating 206 (e.g., by the memory module 104), based on the compound memory command 204, a plurality of memory commands 210 to apply the one or more operations to each portion of the plurality of portions of contiguous memory, including: determining 302 one or more required row activation commands; and generating 304 the one or more required row activation commands; and executing 208 (e.g., by the memory module 104) the plurality of memory commands 210.

The method of FIG. 4 differs from FIG. 3 in that determining 302 one or more required row activation commands includes maintaining 402 a finite state machine. The finite state machine may indicate one or more rows 110 activated (e.g., one or more rows 110 stored in row buffers of respective banks 108) were the memory commands 210 to be executed. The finite state machine may be maintained (e.g., updated) by generating the plurality of memory commands and then updating the finite state machine to determine which rows 110 are required to be activated and in what sequence the rows 110 should be activated to execute the particular memory commands.

Determining 302 one or more required row activation commands also includes determining 404, based on the finite state machine, the one or more row activation commands. For example, a row activation command is generated in response to a transition in the finite state machine indicating that a particular row 110 needs to be activated.

Figure 5:
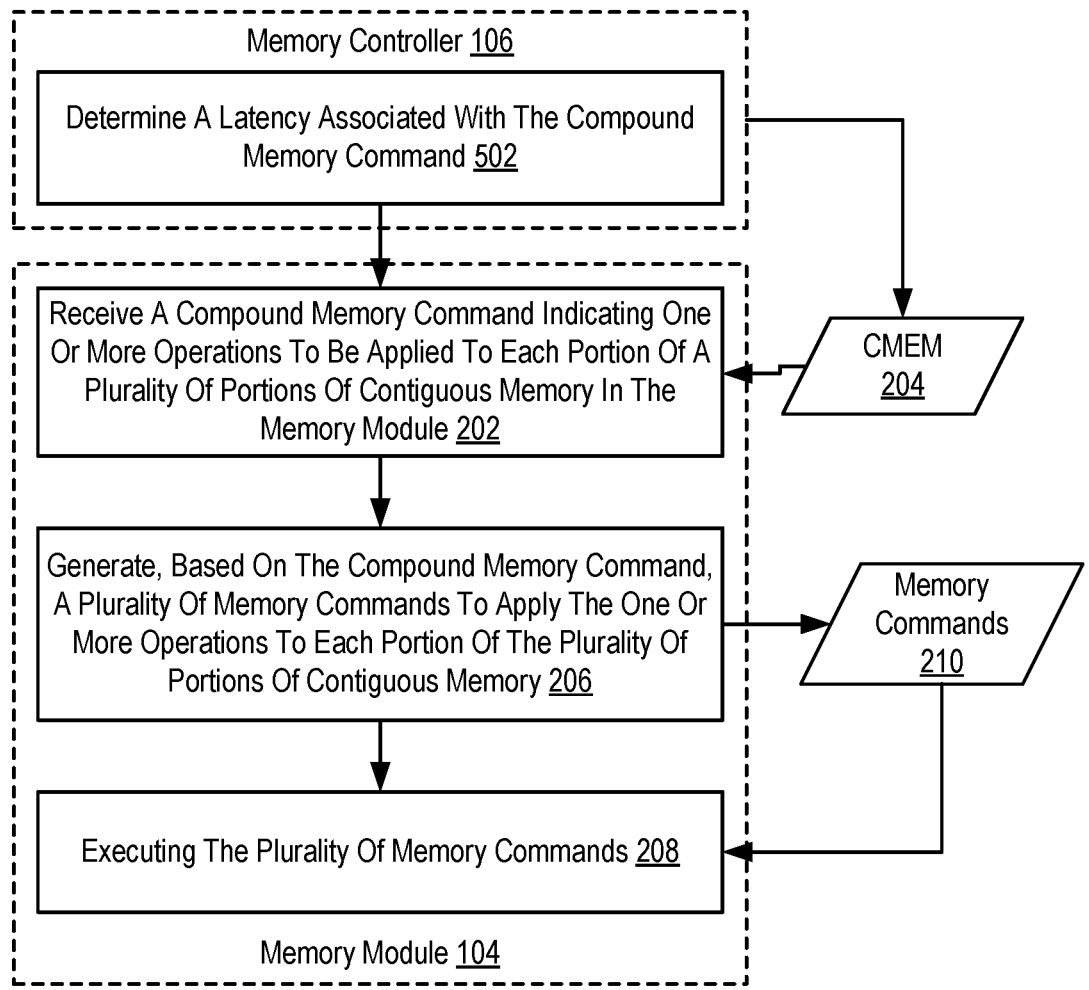
FIG. 5 is a flowchart of an example method for memory operations using compound memory commands according to some embodiments.

For further explanation, FIG. 5 sets forth a flow chart illustrating an exemplary method for memory operations using compound memory commands that includes receiving 202 (e.g., by a memory module 104, from a memory controller 106) a compound memory command (CMEM) 204 indicating one or more operations to be applied to each portion of a plurality of portions of contiguous memory within the memory module; generating 206 (e.g., by the memory module 104), based on the compound memory command 204, a plurality of memory commands 210 to apply the one or more operations to each portion of the plurality of portions of contiguous memory; and executing 208 (e.g., by the memory module 104) the plurality of memory commands 210.

The method of FIG. 5 differs from FIG. 2 in that the method of FIG. 5 includes determining 502 (e.g., by a memory controller 106) a latency associated with the compound memory command 204. Where the contiguous area of memory of a compound memory command 204 is contiguous across a same row 110 of the memory module 104, the latency is estimated as a predefined latency timing for issuing a memory command to a column 112 multiplied by the number of columns 112 associated with the particular compound memory command 204. In some embodiments, the predefined latency timing is established as a configuration setting for a memory module memory module 104, a firmware setting, or otherwise defined.

Where the contiguous area of memory is contiguous across multiple rows 110 of the memory module 104, the latency is calculated by determining, based on a start address and end address indicated in the compound memory command 204, which banks 108 are associated with the contiguous area of memory, the number rows 110 associated with the compound memory command 204, and whether a first row 110 accessed in each bank 108 is already open, therefore not requiring a row activation command. The latency is then calculated using these values and one or more memory timing values.

Figure 6:
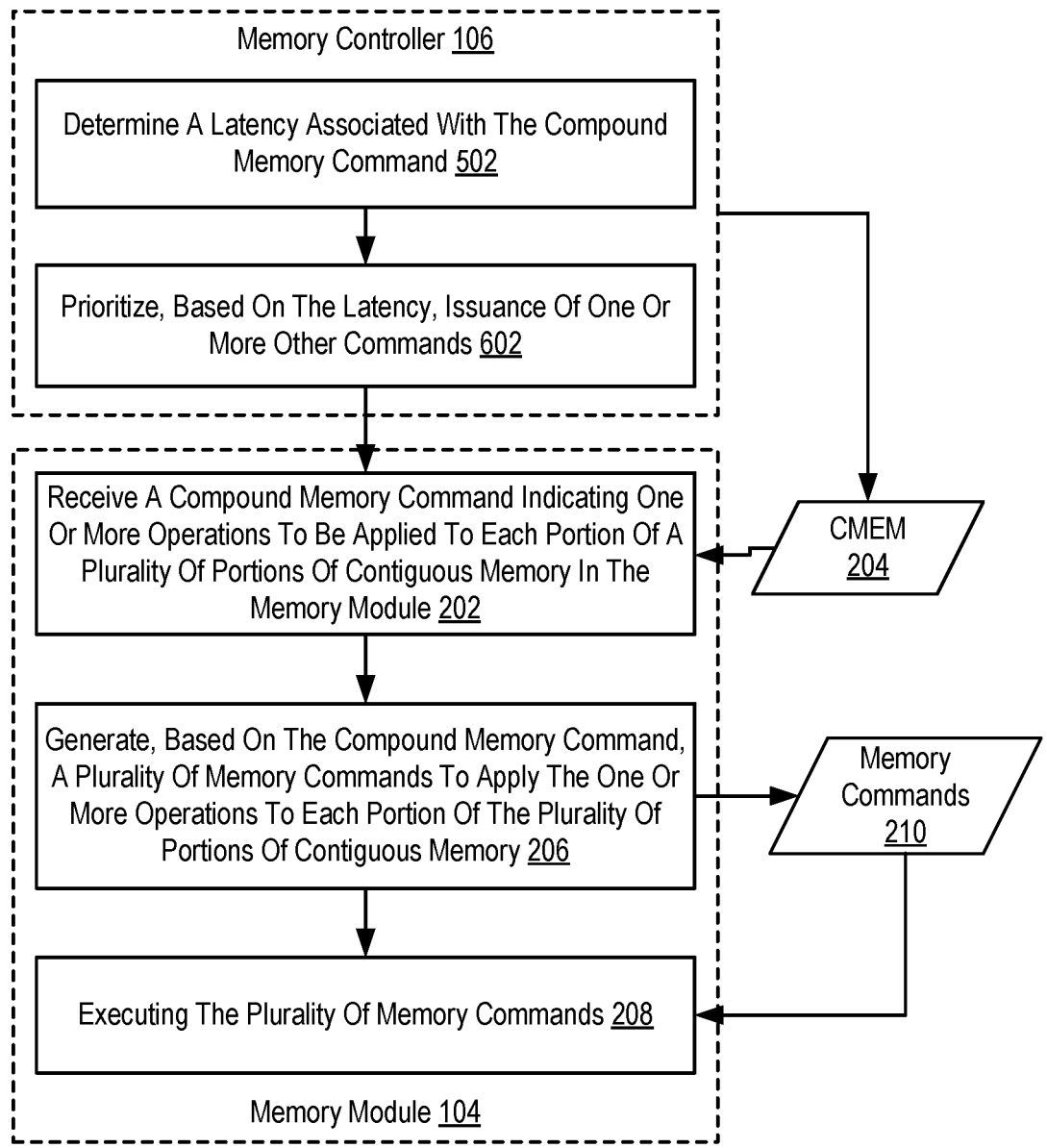
FIG. 6 is a flowchart of an example method for memory operations using compound memory commands according to some embodiments.

For further explanation, FIG. 6 sets forth a flow chart illustrating an exemplary method for memory operations using compound memory commands that includes determining 502 (e.g., by a memory controller) a latency associated with the compound memory command 204; receiving 202 (e.g., by a memory module 104, from the memory controller 106) a compound memory command (CMEM) 204 indicating one or more operations to be applied to each portion of a plurality of portions of contiguous memory of the memory module 104; generating 206 (e.g., by the memory module 104), based on the compound memory command 204, a plurality of memory commands 210 to apply the one or more operations to each portion of the plurality of portions of contiguous memory; and executing 208 (e.g., by the memory module 104) the plurality of memory commands 210.

The method of FIG. 6 differs from FIG. 5 in that the method of FIG. 6 includes prioritizing 602, based on the latency, issuance of one or more other commands. For example, in some embodiments, the latency or a weighted latency is used as a threshold. Other commands having latencies falling below the threshold are prioritized and issued to memory modules 104 before the compound memory command 204.

Figure 7:
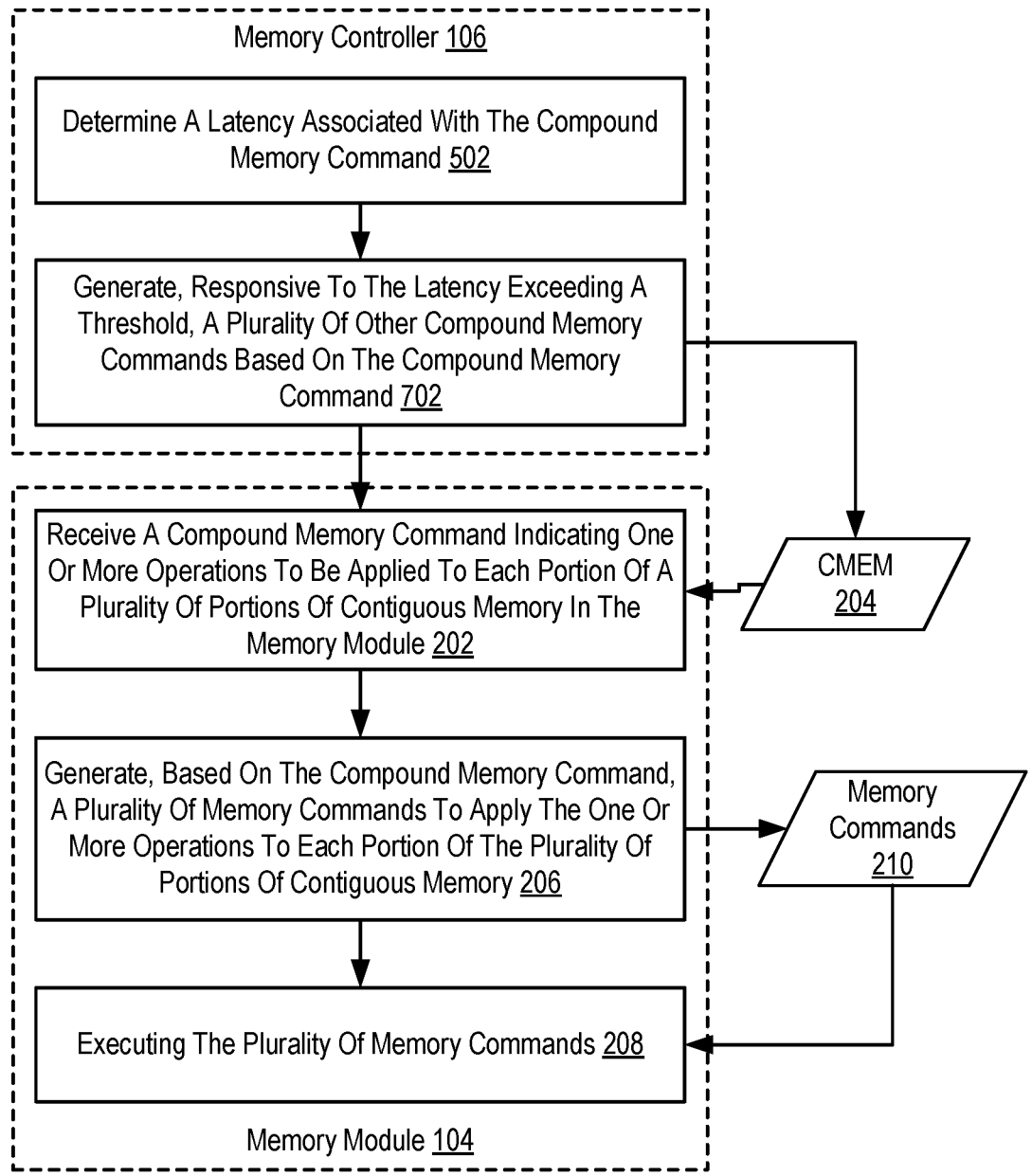
FIG. 7 is a flowchart of an example method for memory operations using compound memory commands according to some embodiments.

For further explanation, FIG. 7 sets forth a flow chart illustrating an exemplary method for memory operations using compound memory commands that includes determining 502 (e.g., by a memory controller) a latency associated with the compound memory command 204; receiving 202 (e.g., by a memory module 104, from the memory controller 106) a compound memory command (CMEM) 204 indicating one or more operations to be applied to each portion of a plurality of portions of contiguous memory of the memory module 104; generating 206 (e.g., by the memory module 104), based on the compound memory command 204, a plurality of memory commands 210 to apply the one or more operations to each portion of the plurality of portions of contiguous memory; and executing 208 (e.g., by the memory module 104) the plurality of memory commands 210.

The method of FIG. 7 differs from FIG. 5 in that the method of FIG. 6 includes generating 206 (e.g., by the memory controller 106), responsive to the latency exceeding a threshold, a plurality of other compound memory commands based on the compound memory command 204. In some embodiments, a compound memory command 204 associated with a contiguous area of memory is generated into multiple compound memory commands corresponding to subdivisions of the contiguous area of memory. For example, a compound memory command 204 associated with an area of memory contiguous across multiple rows 110 may be generated into compound memory commands each corresponding to a row 110 in the area of contiguous memory. As another example, a compound memory command 204 associated with an area of memory contiguous across multiple columns 112 in a same row 110 may be generated into multiple compound memory commands each associated with a subdivision of the columns 112. In some embodiments, the latency for the generated compound memory commands are recalculated. Other instructions are prioritized and/or other compound memory commands are generated accordingly, based on the recalculated latencies. The generated compound memory commands are then provided to the memory module 104.

In view of the explanations set forth above, readers will recognize that the benefits of memory operations using compound memory commands include:

Improved performance of a computing system by improved bandwidth usage between the processor, memory controller, and memory modules by compounding individual memory commands into a compound memory command.

Exemplary embodiments of the present disclosure are described largely in the context of a fully functional computer system for memory operations using compound memory commands. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method of memory operations using compound memory commands, the method comprising:
   receiving, by a memory module, a compound memory command, wherein the compound memory command is a single command that includes an indication of one or more operations that are applicable to each portion of a plurality of portions of contiguous memory in the memory module, wherein the compound memory command indicates a start address and an end address of the plurality of portions of contiguous memory, and wherein the end address indicates a number of columns from the start address;
   generating, based on the compound memory command, a plurality of memory commands to apply the one or more operations to each portion of the plurality of portions of contiguous memory; and
   executing the plurality of memory commands.

2. The method of claim 1, wherein generating the plurality of memory commands comprises:
   determining one or more required row activation commands; and
   generating the one or more required row activation commands.

3. The method of claim 2, wherein determining the one or more required row activation commands comprises:
   maintaining a finite state machine; and
   determining, based on the finite state machine, a start address, and an end address, the one or more required row activation commands.

4. The method of claim 1, further comprising determining, by a memory controller, a latency associated with the compound memory command.

5. The method of claim 4, further comprising prioritizing, by the memory controller, based on the latency, issuance of one or more other commands to the memory module.

6. The method of claim 4, further comprising generating, by the memory controller, responsive to the latency exceeding a threshold, a plurality of other compound memory commands based on the compound memory command.

7. An apparatus for memory operations using compound memory commands comprising:
   a processor;
   a memory controller communicatively coupled to the processor; and
   a memory module communicatively coupled to the memory controller, the memory module configured to perform steps comprising:
   receiving, by a memory module, a compound memory command, wherein the compound memory command is a single command that includes an indication of one or more operations that are applicable to each portion of a plurality of portions of contiguous memory in the memory module, wherein the compound memory command indicates a start address and an end address of the plurality of portions of contiguous memory, and wherein the end address indicates a number of columns from the start address;
   generating, based on the compound memory command, a plurality of memory commands to apply the one or more operations to each portion of the plurality of portions of contiguous memory; and
   executing the plurality of memory commands.

8. The apparatus of claim 7, wherein generating the plurality of memory commands comprises:
   determining one or more required row activation commands; and
   generating the one or more required row activation commands.

9. The apparatus of claim 8, wherein determining the one or more required row activation commands comprises:
   maintaining a finite state machine; and
   determining, based on the finite state machine, a start address, and an end address, the one or more required row activation commands.

10. The apparatus of claim 7, wherein the memory controller is configured to determine a latency associated with the compound memory command.

11. The apparatus of claim 10, wherein the memory controller is configured to prioritize, based on the latency, issuance of one or more other commands to the memory module.

12. The apparatus of claim 10, wherein the memory controller is configured to generate, responsive to the latency exceeding a threshold, a plurality of other compound memory commands based on the compound memory command.

13. A memory module for memory operations using compound memory commands, the memory module comprising logic to:
   receive a compound memory command, wherein the compound memory command is a single command that includes an indication of one or more operations that are applicable to each portion of a plurality of portions of contiguous memory in the memory module, wherein the compound memory command indicates a start address and an end address of the plurality of portions of contiguous memory, and wherein the end address indicates a number of columns from the start address;
   generate, based on the compound memory command, a plurality of memory commands to apply the one or more operations to each portion of the plurality of portions of contiguous memory; and
   executing the plurality of memory commands.

14. The memory module of claim 13, wherein generating the plurality of memory commands comprises:
   determining one or more required row activation commands; and
   generating the one or more required row activation commands.

15. A method of memory operations using compound memory commands, the method comprising:
   receiving, by a memory controller, from a processor, a compound memory command, wherein the compound memory command is a single command that includes an indication of one or more operations that are applicable to each portion of a plurality of portions of contiguous memory in a memory module, wherein the compound memory command indicates a start address and an end address of the plurality of portions of contiguous memory;
   generating, based on the compound memory command, a plurality of memory commands to apply the one or more operations to each portion of the plurality of portions of contiguous memory; and
   transmitting, to the memory module, the plurality of memory commands.

16. The method of claim 15, further comprising determining, by the memory controller, a latency associated with the compound memory command.

17. The method of claim 16, further comprising prioritizing, by the memory controller, based on the latency, issuance of one or more other commands to the memory module.

18. The method of claim 16, further comprising generating, by the memory controller, responsive to the latency exceeding a threshold, a plurality of other compound memory commands based on the compound memory command.

* * * * *